United States Patent
Yazawa (10) Patent No.: US 7,156,375 B2
(45) Date of Patent: Jan. 2, 2007

(54) HUMIDIFIER

(75) Inventor: Shigenori Yazawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/995,349

(22) Filed: Nov. 24, 2004

(65) Prior Publication Data

US 2005/0116365 A1    Jun. 2, 2005

(30) Foreign Application Priority Data

Nov. 27, 2003   (JP) .............................. 2003-397562

(51) Int. Cl.
    *B01F 3/04*    (2006.01)
(52) U.S. Cl. ...................... 261/23.1; 261/104
(58) Field of Classification Search ............... 261/23.1, 261/102, 104, 105; 128/203.12, 204.13
See application file for complete search history.

(56) References Cited

U.S. PATENT DOCUMENTS

| | | | | |
|---|---|---|---|---|
| 835,243 A | * | 11/1906 | Jeffreys | 55/485 |
| 2,111,936 A | * | 3/1938 | Murphy | 96/408 |
| 3,228,876 A | * | 1/1966 | Mahon | 210/638 |
| 4,031,012 A | * | 6/1977 | Gics | 210/321.81 |
| 4,707,267 A | * | 11/1987 | Johnson | 210/650 |
| 5,797,974 A | * | 8/1998 | Flaherty et al. | 55/482 |
| 6,554,261 B1 | * | 4/2003 | Katagiri et al. | 261/154 |
| 6,669,177 B1 | * | 12/2003 | Shimanuki et al. | 261/96 |
| 6,755,399 B1 | * | 6/2004 | Shimanuki et al. | 261/104 |
| 6,805,988 B1 | * | 10/2004 | Shimanuki et al. | 429/34 |
| 2002/0041989 A1 | | 4/2002 | Shimanuki et al. | |

FOREIGN PATENT DOCUMENTS

| JP | 2002-66262 A | 3/2002 |
|---|---|---|
| JP | 2002-66265 A | 3/2002 |
| JP | 2003-65566 A | 3/2003 |

* cited by examiner

*Primary Examiner*—Scott Bushey
(74) *Attorney, Agent, or Firm*—Foley & Lardner LLP (57) ABSTRACT

A humidifier includes a hollow-fiber-membrane module shaped tubular and a support configured to axially slideably support the module.

13 Claims, 10 Drawing Sheets

HUMIDIFIER

BACKGROUND OF THE INVENTION

1. Field of the Invention

The present invention relates to a humidifier employing hollow fiber membranes and adapted for use in a fuel cell system.

2. Description of Related Art

An example of a conventional humidifier is disclosed in Japanese Patent Application Laid-open Publication No. 2002-66262. The disclosed humidifier arranges a bundle of hollow fiber membranes having a vapor permeation property in a cylindrical tube to form a hollow-fiber-membrane module. The cylinder is provided at a first end of a circumferential wall with a humidified gas outlet and at a second end of a circumferential wall with an inlet of dry gas (gas to be humidified).

The module is provided at its axial ends with first and second header blocks, respectively, which are fastened together with through-bolts.

The first header block has a wet gas introducing passage and a humidified gas discharging passage. The wet gas introducing passage is connected to the first end of tube, and communicating with each hollow fiber membrane. The humidified gas discharging passage is connected to the humidified gas outlet The second header block has a wet gas discharging passage and a dry gas introducing passage. The humidified gas discharging passage is connected to the second end of tube, and communicating with each hollow fiber membrane. The dry gas introducing passage is connected to the dry gas inlet.

To the first end of tube is supplied a wet gas, which is passed through the inside of the hollow fiber membranes, and is discharged from the second end of tube. To the dry gas inlet is supplied a dry gas to be humidified, which is passed along the outside of the hollow fiber membranes in the tube, and is discharged from the humidified gas outlet. Therealong, moisture is transmitted between the inside and outside of the hollow fiber membranes to humidify the dry gas to be humidified.

SUMMARY OF THE MENTION

In the humidifier, the fastening force of the through-bolts always applies a compression force from the first and second header blocks to the tube. With this structure, the tube needs to have a wall thickness to provide a sufficient support for the header blocks so that the humidifier has an increased weight and costs high in manufacturing.

In addition, the hollow fiber membranes tend to axially contract as the temperature of the hollow fiber membranes increases. Accordingly, when the temperature of a gas passing through the hollow fiber membranes increases, the tube receives a compression stress due to the contraction of the hollow fiber membranes in addition to the initial compression stress exerted on the tube by the through-bolts. This sometimes results in deformation of the tube. When the tube contracts with increased temperature of a passing gas, gaps will be formed between the tube and the header blocks and sealing effects will deteriorate because of the gaps.

It is an object of the present invention to provide a humidifier having a decreased wall thickness of a tubular hollow-fiber-membrane module.

According to an aspect of the present invention, there is provided a humidifier including a hollow-fiber-membrane module shaped tubular and a support configured to axially slideably support the module.

DETAILED DESCRIPTION OF THE PREFFERED EMBODIMENTS

Description will be made of a preferred embodiment of the present invention with reference to the accompanying drawings.

Figure 1:
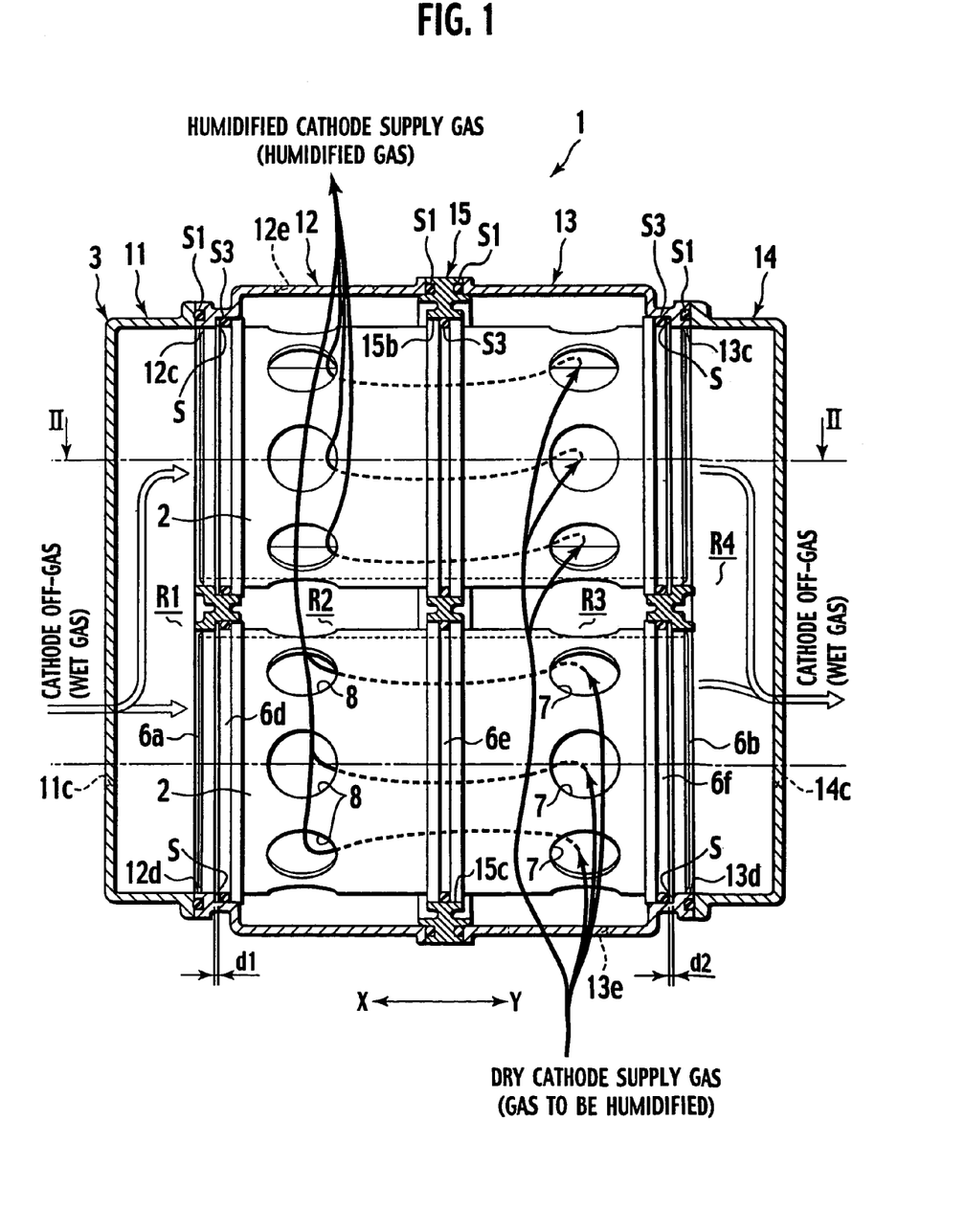
FIG. 1 is a sectional view of a humidifier according to an embodiment of the present invention.
Figure 2:
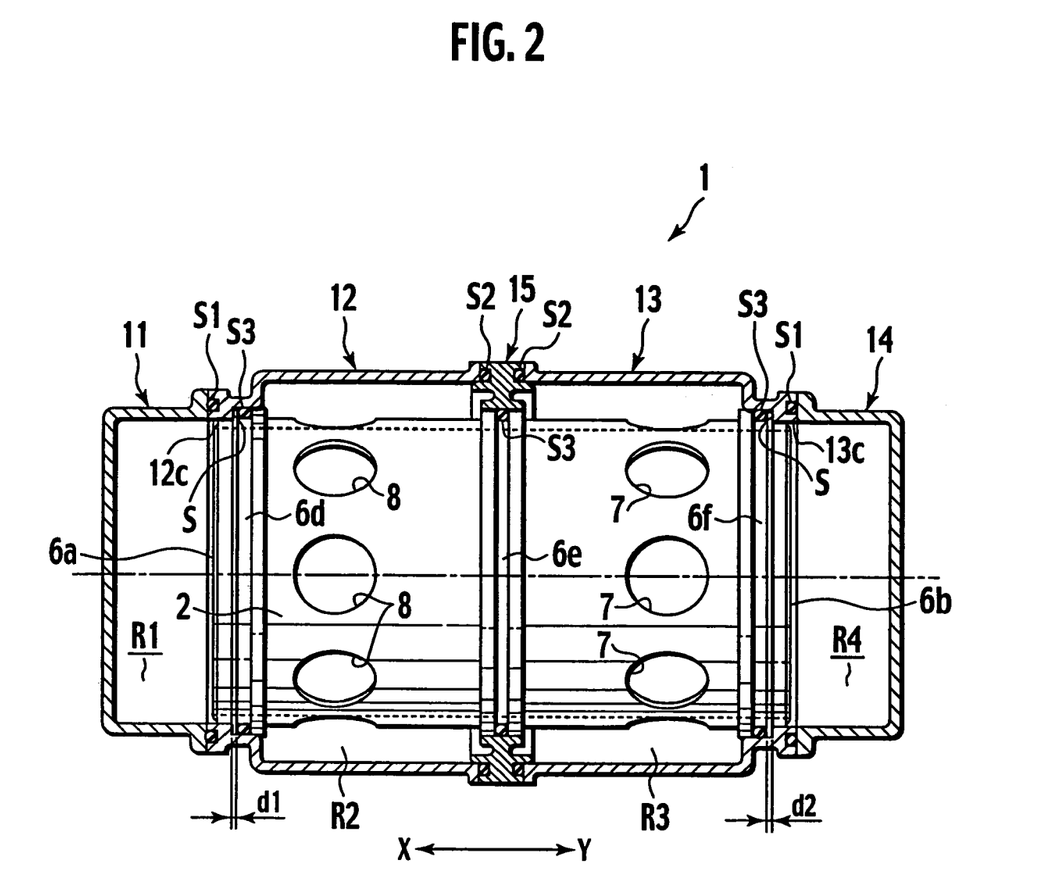
FIG. 2 is a sectional view along Line II—II of FIG. 1.
Figure 3A:
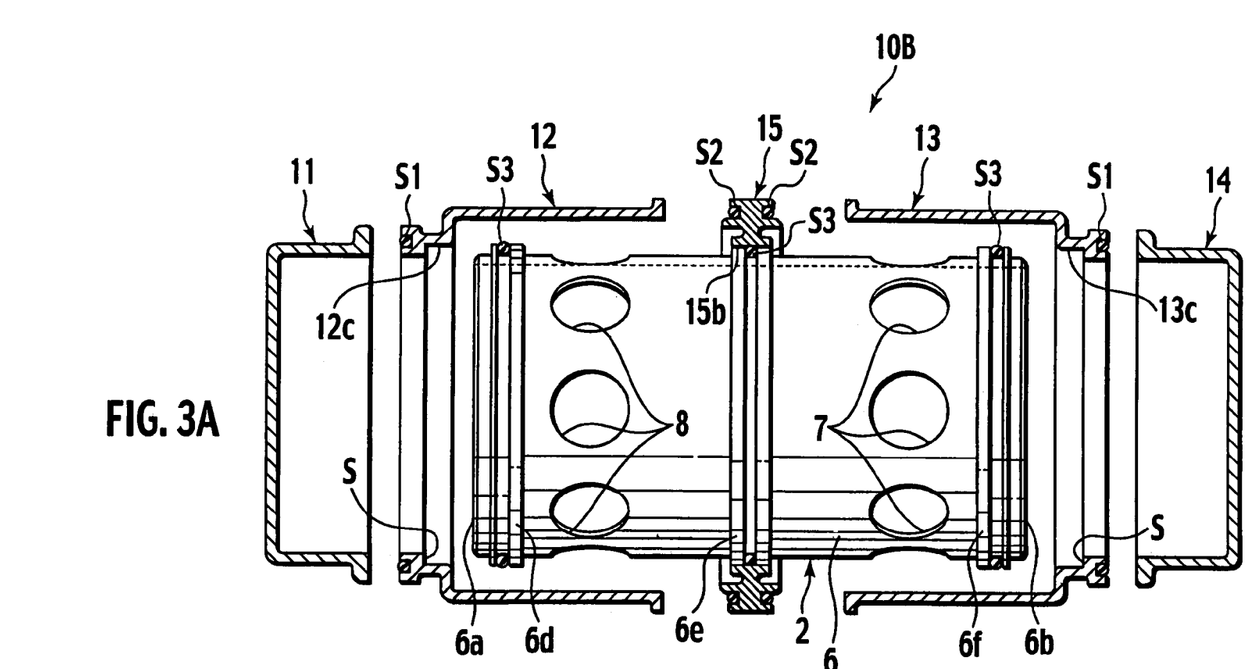
FIG. 3A is an exploded view of the humidifier of FIG. 1.
Figure 3B:
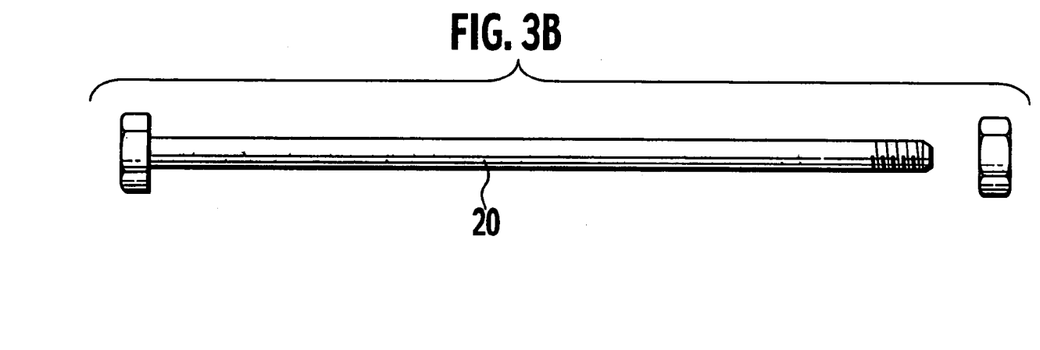
FIG. 3B is a side view of a through-bolt of the humidifier of FIG. 1.

In FIGS. 1 to 3, a humidifier 1 according to an embodiment of the present invention has two hollow-fiber-membrane modules 2 and a housing 3 accommodating the modules 2. Each module 2 is configured as a moisture exchanger between a moist gas and a dry gas, and has a cylindrical tubular configuration. The housing 3, configured as a distributing support, supports the modules 2 and distributes the moist gas and the dry gas to the modules 2.

Figure 4:
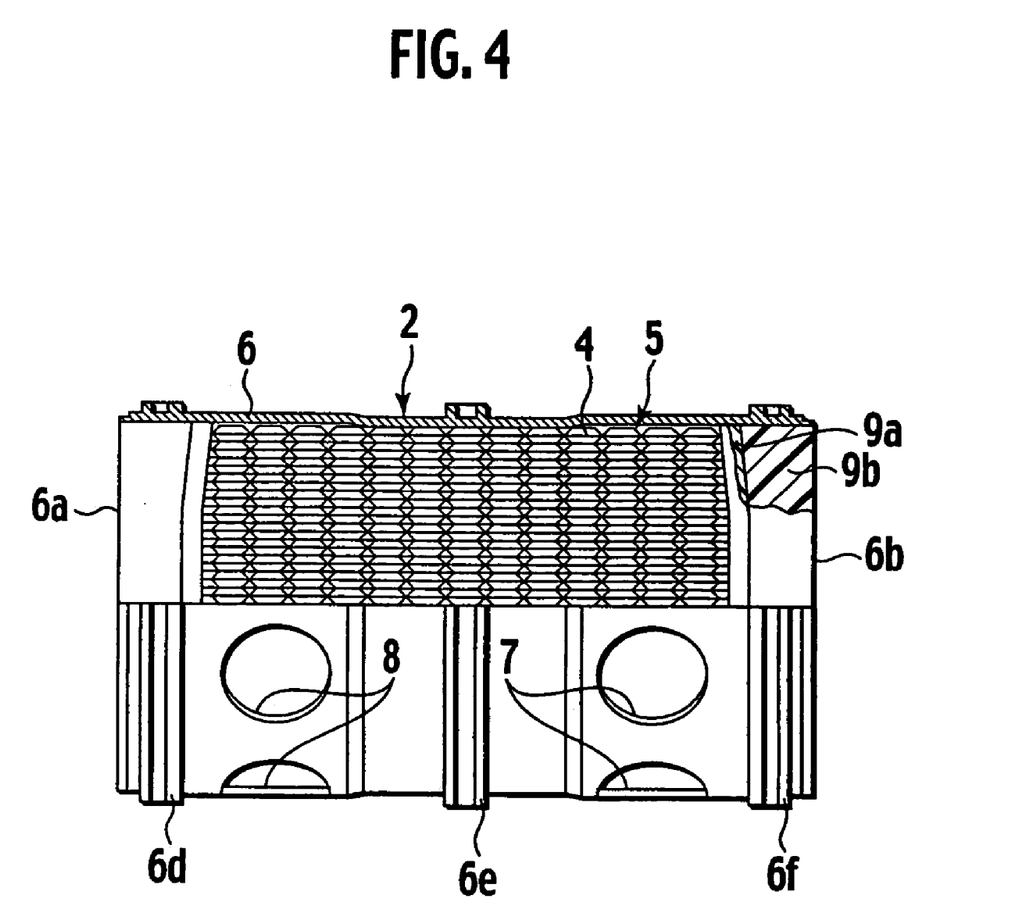
FIG. 4 is a view, partly in section, of a hollow-fiber-membrane module in the humidifier of FIG. 1.

Each module 2 includes a cylinder 6 as tubular member. In FIG. 4, the cylinder 6 incorporates a bundle 5 of hollow fiber membranes 4 having a vapor permeation property, The cylinder 6 has a first-end opening 6a as the wet gas inlet, a second-end opening 6b as the wet gas outlet, a plurality of humidified gas outlets 8 on a first end side of the circumferential wall of cylinder 6, and a plurality of dry gas (gas to be humidified) inlets 7 on a second end side of the circumferential wall of cylinder 6.

In FIG. 4, the hollow fiber membrane bundle 5 comprises about 5000 hollow fiber membranes 4. At the end regions 6a and 6b of cylinder 6, the bundle 5 is fixed inside the cylinder 6 with bonding materials 9a and 9b. The bonding materials 9a and 9b fill gaps between the membranes 4 so as to air-tightly close the end regions 6a and 6b of cylinder 6 with the ends of each membrane 4 being exposed and opened. In an intermediate part between the end regions 6a and 6b of the cylinder 6, the hollow fiber membranes 4 maintain a gaps therebetween.

Each hollow fiber membrane 4 has an inner diameter of about 300 to 700 micrometers. The hollow fiber membrane 4 provides a gas passage through the inside thereof, condenses water contained in the gas, and transmits the condensed water to the outside via capillarity paths.

In FIGS. 1 to 3, the housing 3 has a separator 15, four cylindrical manifolds 11, 12, 13, and 14, each manifold having one bottom 11b, 12b, 13b, and 14b. The manifolds 11 and 12 are set together on a first side of the separator 15, and the manifolds 13 and 14 are set together on a second side of the separator 15 to define, in the housing 3, four chambers R1, R2, R3, and R4 aligned in an direction X-Y as shown by the arrow in FIGS. 1 and 2.

Figures 6A, 6B:
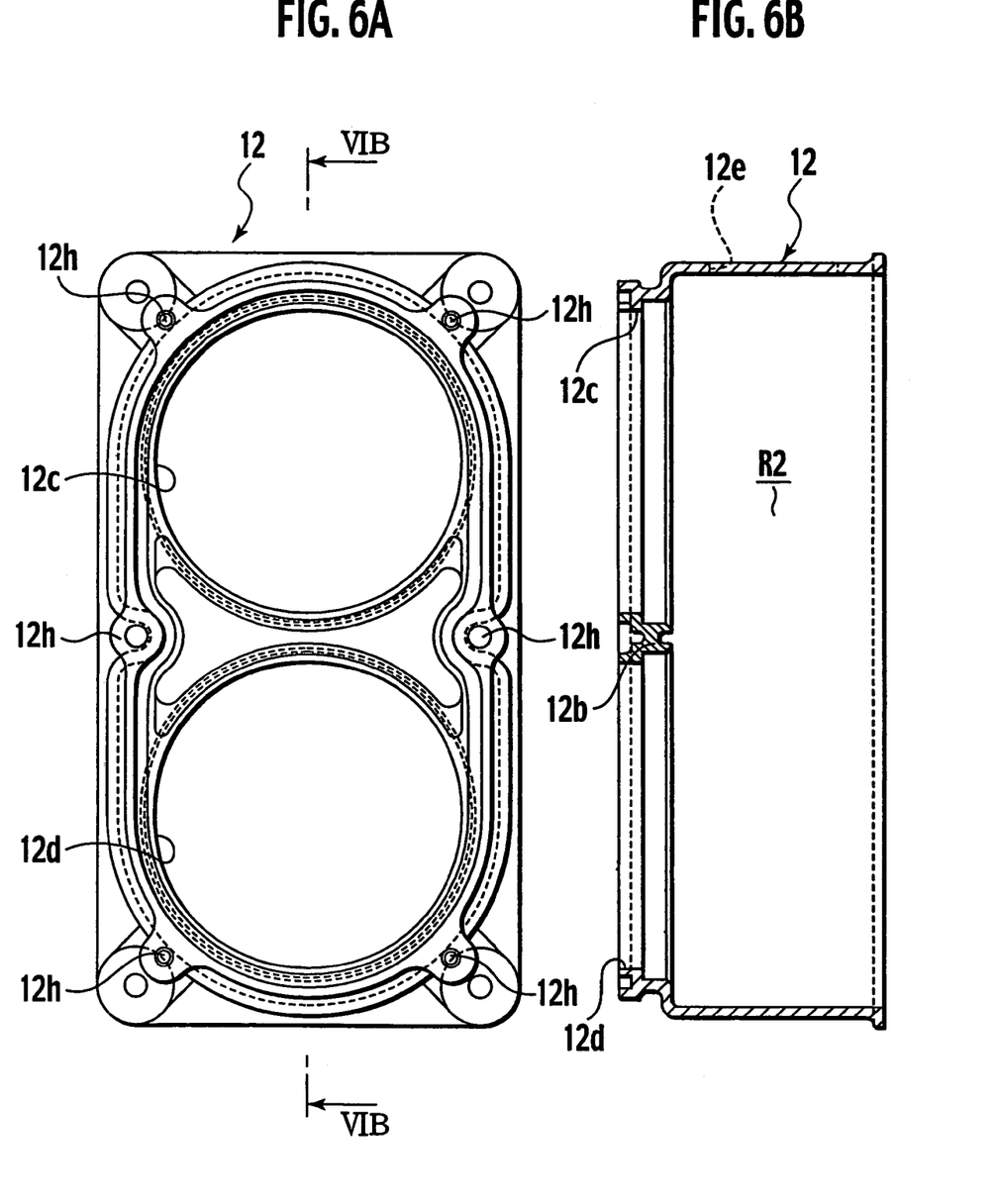
FIG. 6A is a side view of a humidified gas discharge manifold along arrow Y of the humidifier of FIG. 1.
FIG. 6B is a sectional view along line VIB—VIB of FIG. 6A.
Figures 7A, 7B:
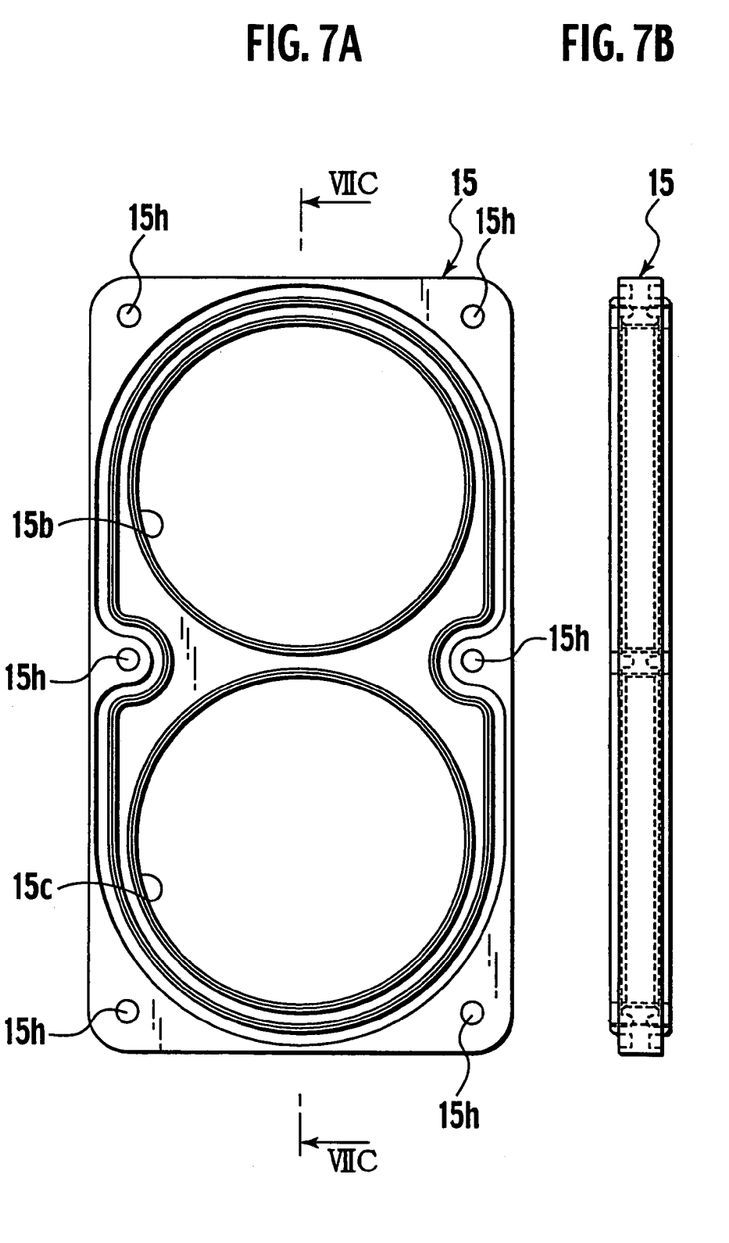
FIG. 7A is a side view of a separator along arrow Y of FIG. 1.
FIG. 7B is a front view of the separator of FIG. 7C.
Figure 7C:
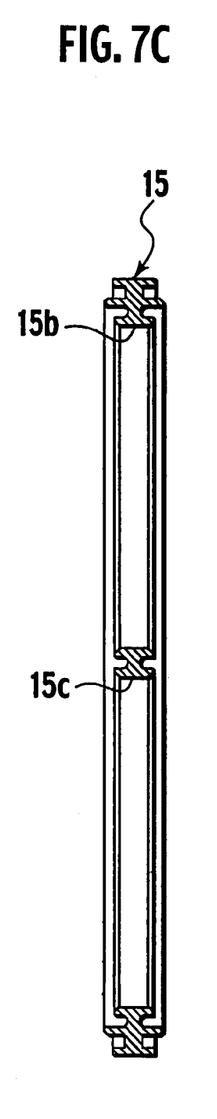
FIG. 7C is a sectional view along line VIIC—VIIC of FIG. 7A.
Figure 8A:
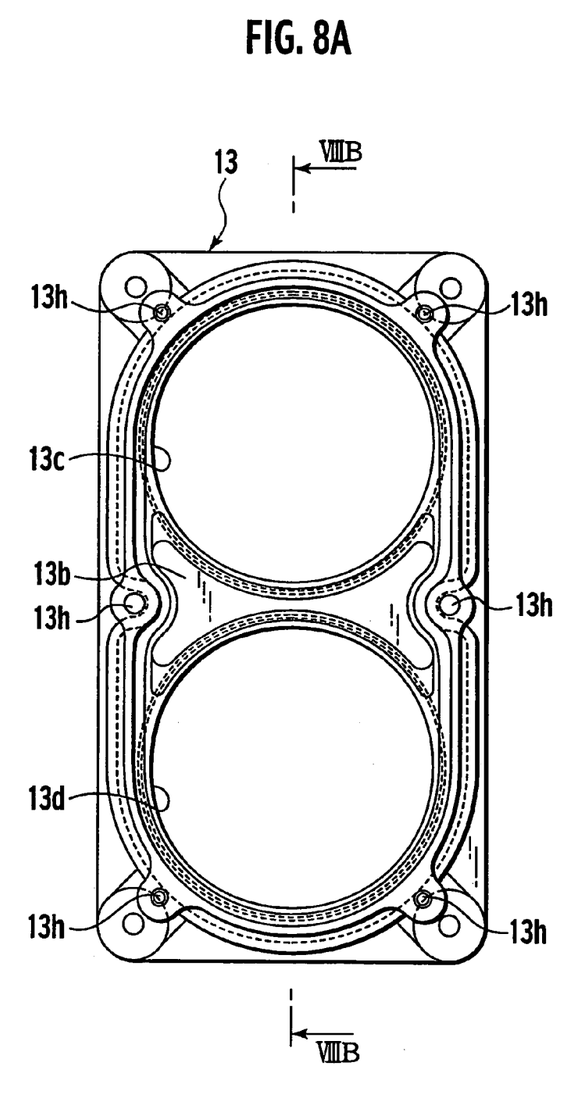
FIG. 8A is a side view of a dry gas inlet manifold along arrow Y of FIG. 1.
Figure 8B:
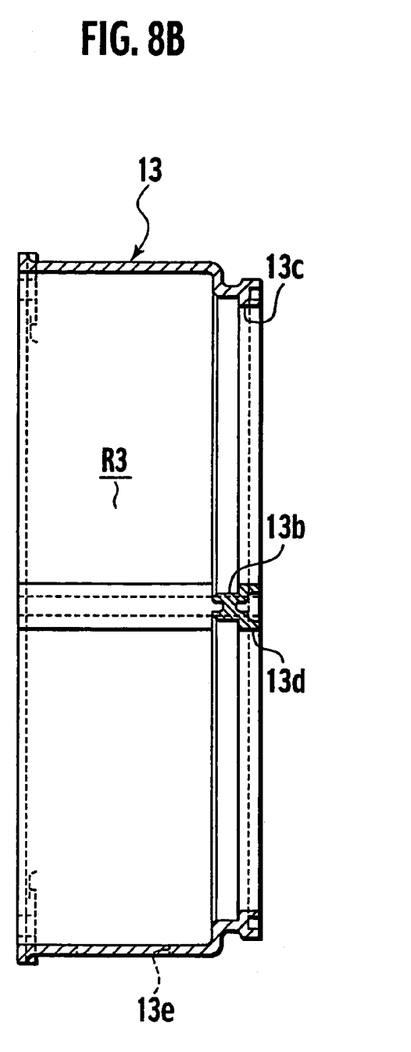
FIG. 8B is a sectional view along line VIIIB—VIIIB of FIG. 8A.

In FIGS. 1 and 2, each module 2 extends through the two intermediate chambers R2 and R3 to the end chambers R1 and R4, to have open ends 6a and 6b in the end chambers R1 and R4, respectively. The separator 15 has two through-holes 15b and 15c for receiving the modules 2, respectively, as shown in FIG. 7. The bottom 12b of manifold 12 has through-holes 12c and 12d for receiving the modules 2, respectively, as shown in FIG. 6. The bottom 13b of manifold 13 has through-holes 13c and 13d for receiving the modules 2, respectively, as shown in FIG. 8.

Among the intermediate manifolds 12 and 13, the manifold 13 (the third manifold from the left side of FIG. 1) is provided at its circumferential wall with a dry gas (gas to be humidified) inlet 13e. The dry gas inlets 7 of module 2 are located in the chamber R3 in the manifold 13. Accordingly, the chamber R3 in the manifold 13 serves as a passage for introducing dry gas.

The manifold 12 (the second manifold from the left side of FIG. 1) is provided at its circumferential wall with a humidified gas outlet 12e. The humidified gas outlets 8 of module 2 are located in the chamber R2 in the manifold 12. Accordingly, the chamber R2 in the manifold 12 serves as a passage for discharging humidified gas, which is humidified while flowing along the outside of the hollow fiber membranes 4 in the cylinder 6.

Among the end manifolds 11 and 14, the manifold 11 (the first manifold from the left side of FIG. 1) is provided at the bottom 11b with a wet gas inlet 11c. The first-end opening 6a (on the left side of FIG. 1) of the module 2 is located in the chamber R1 defined in the manifold 11. Accordingly, the chamber R1 in the manifold 11 serves as a passage for introducing wet gas.

Figure 5A:
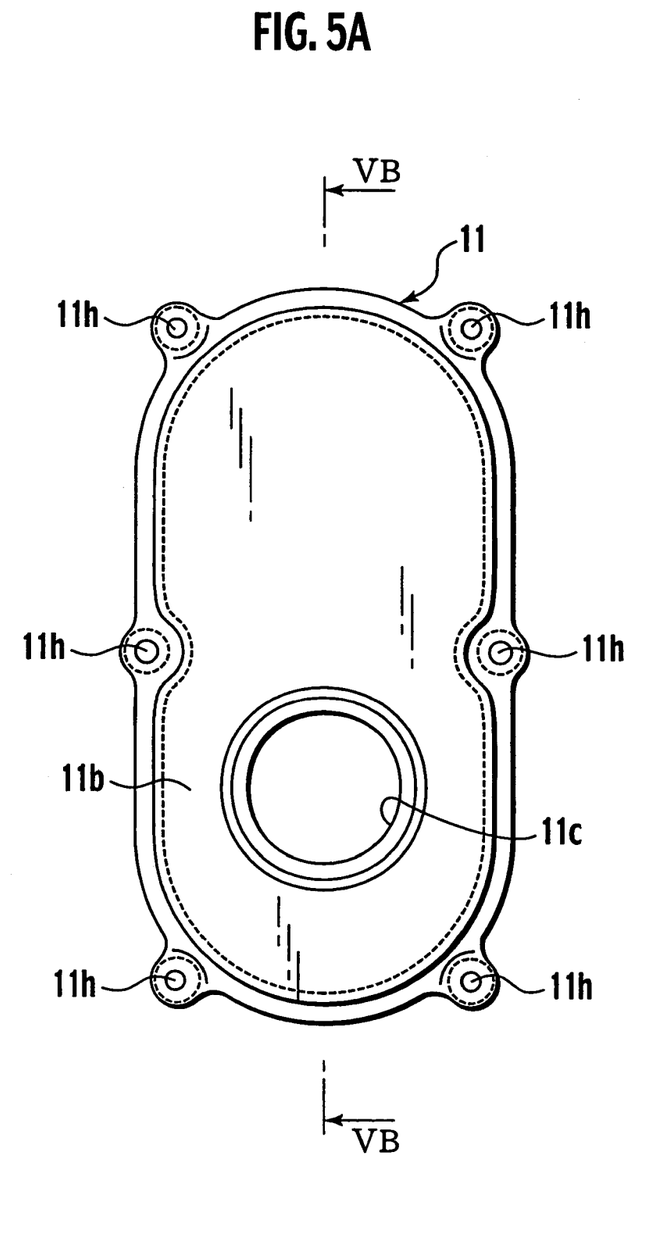
FIG. 5A is a side view of a wet gas inlet manifold along arrow Y of FIG. 1.
Figure 5B:
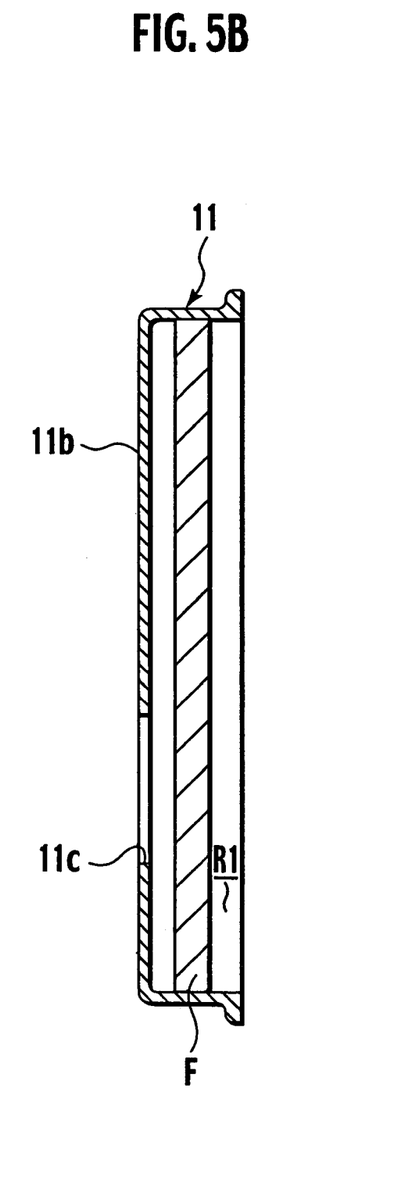
FIG. 5B is a sectional view along line VB—VB of FIG. 5A.
Figure 9A:
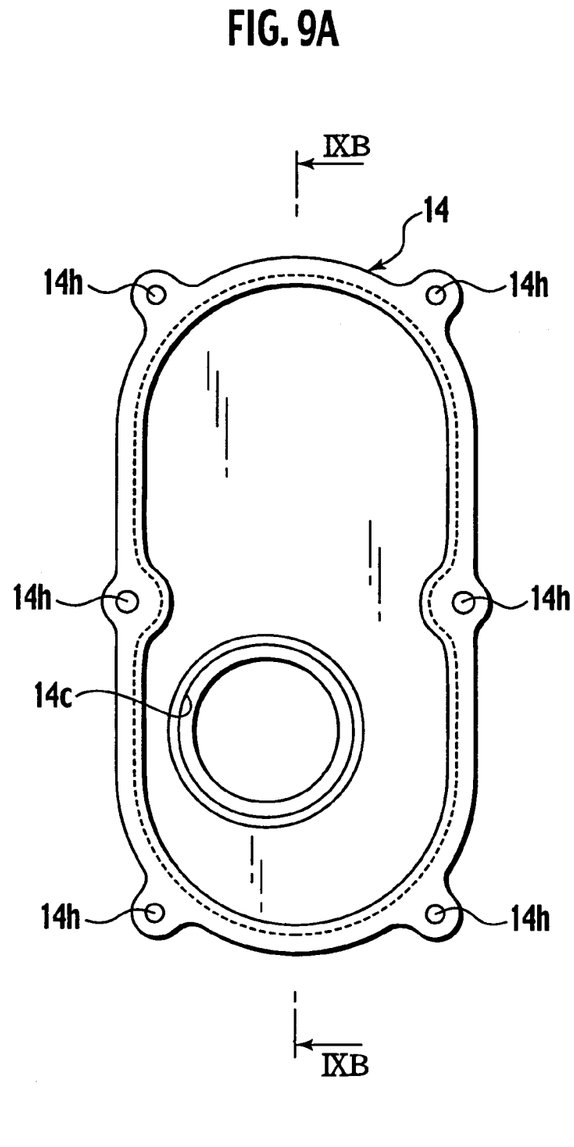
FIG. 9A is a view of a wet gas discharge manifold along arrow Y of FIG. 1.
Figure 9B:
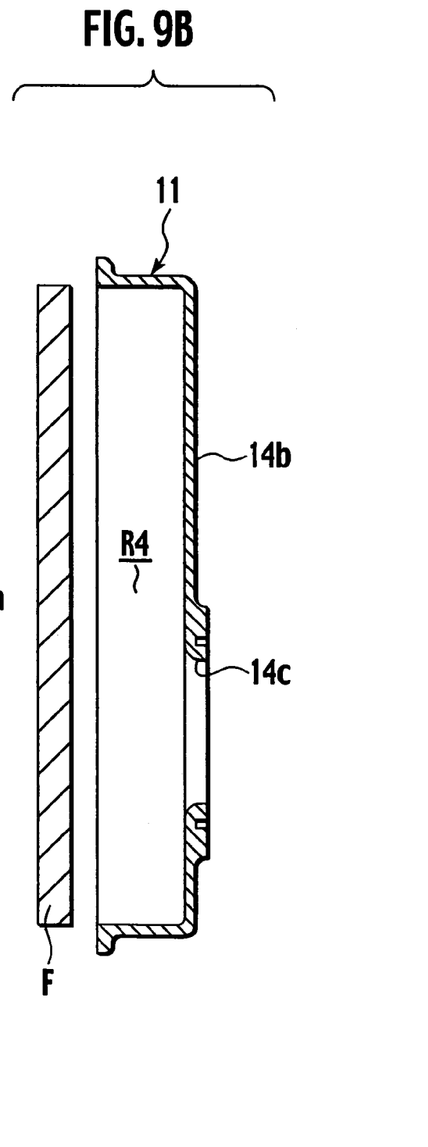
FIG. 9B is a sectional view along line IXB—IXB of FIG. 9A.
Figure 10A:
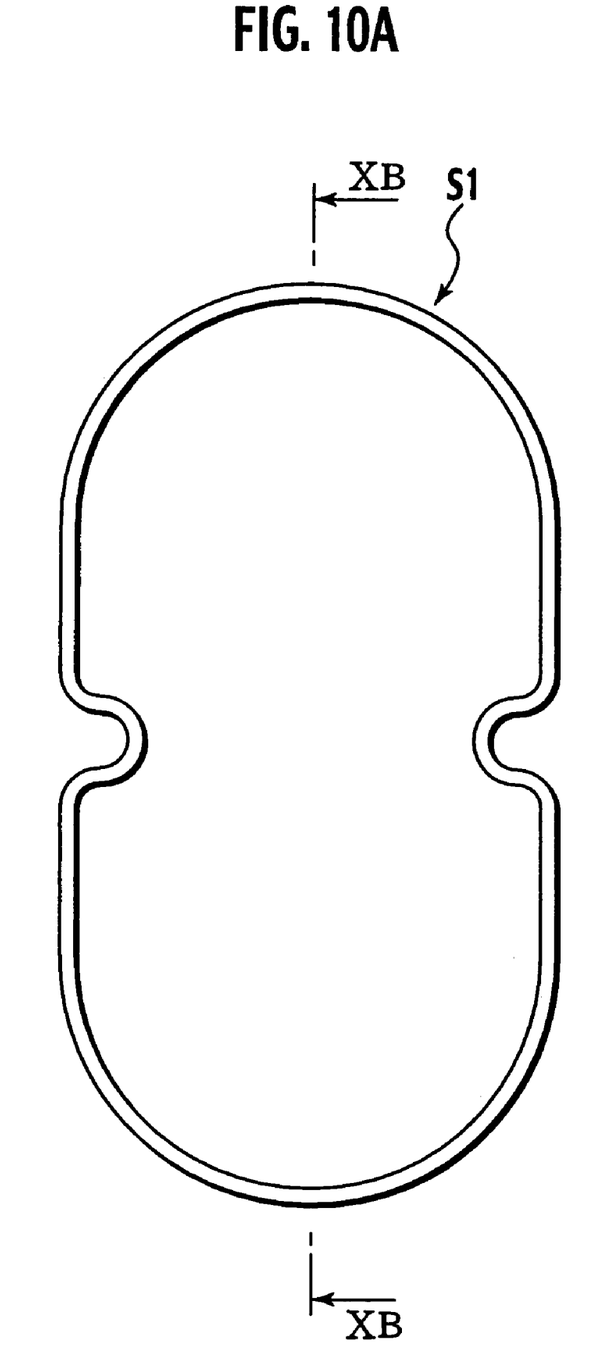
FIG. 10A is a side view of an O-ring, along arrow Y in FIG. 1.
Figure 10B:
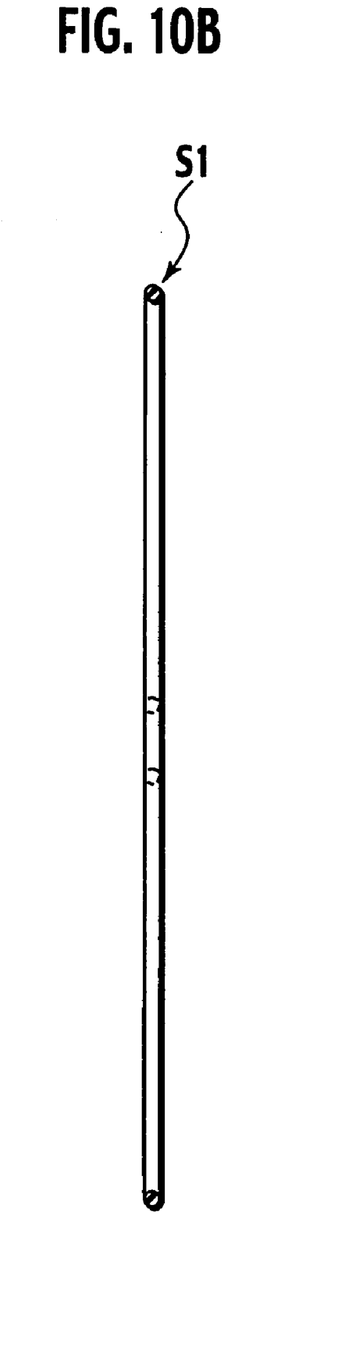
FIG. 10B is a sectional view along line XB—XB of FIG. 10A.

The manifold 14 (the fourth manifold from the left side of FIG. 1) is provided at the bottom 14b with a wet gas outlet 14c. The second-end opening 6b (on the right side of FIG. 1) of the module 2 is located in the chamber R4 in the manifold 14. Due to this, the chamber R4 in the manifold 14 serves as a passage for discharging wet gas. In FIGS. 5 and 9, a reference F represents a filter.

In FIGS. 5 to 9, the four manifolds 11 to 14 and separator 15 have through-holes 11h, 12h, 13h, 14h, and 15h in the peripheries thereof. In an assembled state shown in FIGS. 1 and 2, the manifolds 11 to 14 and separator 15 are fastened together with through-bolts 20 (as show in FIG. 3B) passing through the through-holes 11h to 15h.

Between joint faces of manifold 11 and 12, a gasket S1 is provided, and between joint faces of manifold 13 and 14, another gasket S1 is provided. Likewise, between joint faces of manifold 12 and separator 15, a gasket S2 is provided, and between joint faces of separator 15 and manifold 13, another gasket S2 is provided.

The cylinder 6 has three flanges 6d, 6e, and 6f each formed with a groove for an O-ring S3. Each flange 6d, 6e, and 6f fits in the through-holes 12c and 12d, 13c and 13d, or 15b and 15c with the O-ring S3.

Each through-holes 12c and 12d of manifold 12 has a step S serving as a stopper engaging with the flange 6d, to stop movements of module 2, Likewise, Each through-hole 13c and 13d of manifold 13 has a step S serving as a stopper engaging with the flange 6f, to stop movements of module 2. This configuration prevents the modules 2 from falling off the casing 3. Between flange Ed and step (stopper) S, there is a gap d1, and between the flange 6f and the step S, there is a gap d2, so that the module 2 is allowed to slide in the axial direction X-Y in the housing 3 within a sum "d1+d2" of gaps d1 and d2. Namely, the module 2 in the housing 3 has a degree of freedom of movement in the axial direction X-Y.

The above-noted humidifier 1 may be arranged in, for example, a fuel cell system (not shown), to exchange moisture between a cathode off-gas (wet gas) discharged from a cathode of a fuel cell and having a high moisture content and a dry cathode supply gas (gas to be humidified) pressurized by, for example, a supercharger and having a low moisture content. In this case, the humidifier 1 is used to humidify the dry cathode supply gas.

Characteristics of the humidifier 1 according to the embodiment will be explained.

The tubular module 2 is axially slideably supported in the support 3. In other wards, the tubular module 2 supported in the support 3 has freedom in an axial direction. This configuration applies no axial compression stress on the module 2. Therefore, the wall thickness of tubular module 2 can be decreased. This results in reducing the weight and manufacturing cost of the humidifier 1.

The tubular module 2 includes the tubular member 6 and the bundle of hollow fiber membranes accommodated in the tubular member 6. Therefore, the wall thickness of the tubular member 6 can be decreased. This results in reducing the weight and manufacturing cost of the humidifier 1.

The tubular member 6 includes the wet gas inlet 6a, wet gas outlet 6b, dry gas inlet 7, and humidified gas outlet 8, so that the module 2 exchanges moisture between a moist gas and a dry gas, with a simple structure.

The support 3 defines the wet gas inlet passage R1, wet gas discharge passage R4, dry gas inlet passage R3, and humidified gas discharge passage R2, so that the support 3 distributes the moist gas and the dry gas to the modules 2, with a simple structure.

The support 3 sets the four cylindrical manifolds 11 to 14 and the separator 15 one on another, to define the four chambers R1 to R4, to form the passages R1 to R4. This eliminates the conventional drilling work to drill passages of complicated shapes in head blocks, and therefore, can reduce the manufacturing cost of the humidifier 1.

According to the embodiment, the tubular member 6 is provided at the first-end opening 6a with the wet gas inlet 6a, at a second-end opening 6b with the wet gas outlet 6b, at the circumferential wall of the tubular member 6 with the dry gas inlet 7 and the humidified gas outlet 8. The modules 2 extend through the two intermediate chambers R2 and R3, and the ends 6a and 6b of each of the modules 2 are exposed in the end chambers R1 and R4, respectively. With this configuration, the intermediate chamber R2 serves as a humidified gas discharge passage, the intermediate chamber R3 as a dry gas inlet passage, the end chamber R1 as a wet gas inlet passage, and the end chamber R4 as a wet gas discharge passage.

Through-bolts 20 pass through all of the four manifolds 11 to 14 to fasten the four manifolds 11 to 14 together. Namely, it is not necessary for the embodiment to individually fasten the manifolds with bolts. This further reduces the manufacturing cost of the humidifier 1.

The humidifier 1 employs a plurality of modules 2, to improve the humidifying capacity of the humidifier 1.

The support 3 is configured as the housing 3 of the humidifier, to simplify the structure of humidifier, According to the embodiment, through-bolts 20 pass through not only the manifolds 11 to 14, but also the separator 15, which may be omitted. It is also possible to have the through-bolts 20 passing through only the two end manifolds 11 and 14.

Although the above-noted embodiment employs two hollow-fiber-membrane modules 2, the prevent invention is applicable to a humidifier employing a single hollow-fiber-membrane module.

This application is based upon and claims the benefit of priority from the prior Japanese Patent Application No. 2003-397562 filed on Nov. 27, 2003, the entire contents of which are incorporated herein by reference.

Although the invention has been described above by reference to certain embodiments of the invention, the invention is not limited to the embodiments described above. Modification and variation of the embodiments can be made without departing from sprit or scope of the appended claims. Therefore, the embodiments are only for illustrative purpose and not limit the invention.

What is claimed is:

1. A humidifier comprising:
a hollow-fiber-membrane module configured as a moisture exchanger between a wet gas and a dry gas, the module comprising a pair of flanges;
a support having a cylindrical inner circumference configured to support the module to be axially slideably accommodated therein;
a pair of stoppers fixed to the inner circumference of the support and engagable with the flanges respectively, to stop axial movement of the module;
wherein the support comprises a wet gas inlet passage, a wet gas discharge passage, a dry gas inlet passage, and a humidified gas discharge passage therein; and
wherein the support is provided with four bottomed cylindrical manifolds and a separator assembled together to define four chambers aligned in the axial direction, wherein the four chambers provide the passages, respectively.

2. The humidifier of claim 1, wherein
the module comprises a tubular member, and a bundle of hollow fiber membranes accommodated in the tubular member.

3. The humidifier of claim 2, wherein
the tubular member comprises:
a wet gas inlet communicating with the interior of the hollow fiber membranes to introduce a wet gas into the interior of the hollow fiber membranes;
a wet gas outlet communicating with the interior of the hollow fiber membranes to discharge the wet gas from the interior of the hollow fiber membranes;
a dry gas inlet communicating with the exterior of the hollow fiber membranes in the tubular member to introduce a dry gas to the exterior of the hollow fiber membranes; and p2 a humidified gas outlet communicating with the exterior of the hollow fiber membranes in the tubular member to discharge a humidified gas from the exterior of the hollow fiber membranes,
the support comprises:
the wet gas inlet passage communicating with the wet gas inlet of the tubular member;
the wet gas discharge passage communicating with the wet gas outlet of the tubular member;
the dry gas inlet passage communicating with the dry gas inlet of the tubular member; and
the humidified gas discharge passage communicating with the humidified gas outlet of the tubular member.

4. The humidifier of claim 3, wherein
the tubular member is provided at a first-end opening with the wet gas inlet, at a second-end opening with the wet gas outlet, at a circumferential wall portion with the dry gas inlet and the humidified gas outlet,
the module being arranged through two intermediate chambers so that ends of the module are in two end chambers, respectively.

5. The humidifier of claim 1, wherein
a plurality of modules are arranged in the support.

6. The humidifier of claim 1, wherein
the support is configured as a humidifier housing.

7. The humidifier of claim 2, wherein
the tubular member is configured as a cylinder.

8. A humidifier comprising:
a hollow-fiber-membrane module configured as a moisture exchanger between a wet gas and a dry gas, the module comprising a pair of flange means;
a supporting means having a cylindrical inner circumference configured for supporting the module to be axially slideably accommodated therein;
a pair of stopper means fixed to the inner circumference of the supporting means and engagable with the flange means respectively to stop axial movements of the modules,
wherein the supporting means comprises a wet gas inlet passage, a wet gas discharge passage, a dry gas inlet passage, and a humidified gas discharge passage therein, and
wherein the supporting means is provided with four bottomed cylindrical manifolds and a separator assembled together to define four chambers aligned in the axial direction, so that the four chambers provide the passages, respectively.

9. The humidifier of claim 1, wherein a flange and a stopper are arranged to form a gap between the flange and the stopper to allow the module to slide in an axial direction within the support.

10. The humidifier of claim 8, wherein a flange means and a stopper means are arranged to form a gap between the flange means and the stopper means to allow the module to slide in an axial direction within the supporting means.

11. The humidifier of claim 1, wherein the stoppers are engagable with the flanges respectively to stop axial movements of the module such that the stoppers are unengagable with axial ends of the module.

12. The humidifier of claim 8, wherein the stopper means are engagable with the flange means respectively to stop axial movements of the module such that the stopper means are unengagable with axial ends of the module.

13. The humidifier of claim 1, wherein the manifolds are fastened together with through-bolts that pass through all of the four manifolds.

* * * * *